(12) United States Patent
Palm

(10) Patent No.: US 7,955,036 B2
(45) Date of Patent: Jun. 7, 2011

(54) WASHER AND THREADED ASSEMBLY PROVIDED THEREWITH

(75) Inventor: Erich Palm, Au (CH)

(73) Assignee: SFS intec Holding AG, Heerbrugg (CH)

( * ) Notice: Subject to any disclaimer, the term of this patent is extended or adjusted under 35 U.S.C. 154(b) by 143 days.

(21) Appl. No.: 12/304,161

(22) PCT Filed: Jun. 20, 2007

(86) PCT No.: PCT/EP2007/056119
§ 371 (c)(1),
(2), (4) Date: Dec. 10, 2008

(87) PCT Pub. No.: WO2008/000668
PCT Pub. Date: Jan. 3, 2008

(65) Prior Publication Data
US 2009/0196686 A1    Aug. 6, 2009

(30) Foreign Application Priority Data

Jun. 26, 2006   (DE) .......................... 10 2006 029 253

(51) Int. Cl.
*F16B 39/24*   (2006.01)
(52) U.S. Cl. .......................... 411/155; 411/313; 411/544
(58) Field of Classification Search .................. 411/313, 411/314
See application file for complete search history.

(56) References Cited

U.S. PATENT DOCUMENTS

| | | | | |
|---|---|---|---|---|
| 135,809 A | * | 2/1873 | Hubbard | .......................... 411/149 |
| 162,386 A | * | 4/1875 | Hubbard | .......................... 411/155 |
| 454,289 A | * | 6/1891 | Partz | .............................. 411/155 |
| 851,606 A | * | 4/1907 | Neiburger | ...................... 411/201 |
| 2,321,379 A | | 6/1943 | Green | |
| 3,992,974 A | | 11/1976 | Miki et al. | |
| 4,749,322 A | | 6/1988 | Sygnator | |
| 6,957,931 B2 | * | 10/2005 | Slater | .......................... 405/302.1 |

FOREIGN PATENT DOCUMENTS

| | | |
|---|---|---|
| DE | 19718712 | 10/1998 |
| EP | 0556438 | 8/1993 |
| GB | 1493220 | 11/1977 |

\* cited by examiner

*Primary Examiner* — Gary Estremsky
(74) *Attorney, Agent, or Firm* — Volpe and Koenig, P.C.

(57) ABSTRACT

A washer (14) and a threaded assembly (22) between a screw (30) and a workpiece (42) are provided. The washer (14) is offset up to an angle ($\alpha$) with respect to a flat initial state, such that the washer has an insert thickness ($D_e$) that is substantially greater than the initial thickness ($D_a$) thereof. The washer (14) is made of a malleable material. The length ($L_g$) of an unthreaded shank section (40) of the screw (30) is smaller than the sum of the thickness ($D_w$) of the workpiece (42) and the insert thickness ($D_e$) of the washer (14), and essentially not smaller than the sum of the thickness ($D_w$) of the workpiece (14) and the insert thickness ($D_a$) of the washer (14). When the last thread of the screw (30) leaves the workpiece (42) on being screwed in, the force previously exerted on the washer (14) by the feed of the screw is zero. The washer (14) has been plastically deformed thereby, such that the washer retains the flattened state thereof and bridges the space between the workpiece (42) and the screw head (34) free from play. The workpiece (42) and the washer (14) thereby remain firmly clamped between the head (34) and the thread (36) of the screw (30), and the prevention of inverse rotation is ensured.

5 Claims, 2 Drawing Sheets

WASHER AND THREADED ASSEMBLY PROVIDED THEREWITH

BACKGROUND

The invention relates to a washer to be arranged between a head of a screw and a work piece in a threaded assembly, with the washer having a bore accepting the screw and being spatially deformed around at least one axis extending diametrically through said bore.

Further, the invention relates to a threaded assembly of a screw and a work piece, with the screw having a shaft provided with a thread and at the end facing away from the head having a hole-forming or boring tip and at its end adjacent to the head a shaft section free from threads, and with the work piece comprising at least one or preferably several thin plates.

A known washer of the type mentioned at the outset is represented for example by a corrugated washer, inserted in a threaded assembly for securing the screw from loosening and inverse rotation. Such a corrugated washer is made of spring steel and is elastically deformed during the creation of the threaded assembly, i.e. when the screw is tightened. By the elastic deformation of the corrugated washer the completed threaded assembly remains pre-stressed by an elastic force effective in the direction of the axis of the screw. When in a threaded assembly a potentially existing play is to be compensated, usually washers are used having a defined thickness appropriate to the play to be compensated. Corrugated washers or the like only have a small thickness and are therefore suitable only to a very limited extent, in addition to their function of preventing inverse rotation to be used to compensate play.

A threaded assembly of the type mentioned at the outset is known from DE 197 18 712 C1. A similar threaded assembly is known from U.S. Pat. No. 2,321,379, with in this case the screw not provided with a hole forming or boring tip but merely with the end of the shaft slightly tapering. In both cases the work piece comprises two thin plates, which can be clamped towards each other in a secure manner with the help of the screw. Due to the fact that an unthreaded shaft section is formed between the head and the thread provided on the shaft being of the same size or slightly smaller than the thickness of the two thin plates to be connected to each other, the screw can be overwound after the final placement. A tight assembly of the thin plates forming the work piece without the screw being able to rotate inversely is only ensured if no play exists between the head of the screw and the work piece. For this purpose, the thickness of the work piece must be precisely equivalent to the length of the unthreaded shaft section or may be only slightly greater than the length of the unthreaded shaft section. In general, in the assembled position the two thin plates shall be held in a tightly compressed fashion. If one of the two thin plates is too thin or only one screw is available with its unthreaded shaft section being too long for the existing thickness of the work piece, play develops with no option for compensation being provided in such a threaded assembly. Due to its little thickness a securing washer, similar to a corrugated washer, could be suited to a limited extent only.

EP 0 556 438 A1 describes a screw with an elastically deforming washer for creating a threaded assembly. The elastic restoring force of the washer is used to create a fixed assembly. Even such a washer is able to compensate play to a limited extent only.

SUMMARY

The object of the invention is to provide a washer and a threaded assembly of the type mentioned at the outset such that any play can be compensated over an expanded range and/or that it can secure the screw from loosening by way of inverse rotation.

This object is achieved in a washer of the type mentioned at the outset in that the washer is angular in reference to the diametrical axis such that an angular crown line exists parallel in reference to an axis and the angular washer has an operational thickness greater than the original thickness of the washer, and that the washer is made from a material selected such that the washer cannot be elastically deformed when the threaded assembly is created but rather plastically deforms.

The washer according to the invention can be used, for example, in a threaded assembly in which between the head of a screw not provided with any unthreaded shaft section and a work piece to be fastened on a surface or the like no play shall remain when the screw with its end abutting to a stop or with its drive being turned off by a depth stop of a screw driving device. The washer is plastically deformed during the mounting process and thus eliminates any existing play between the work piece and the head of the screw, namely even in case of an originally large play. The angular shape of the washer allows the compensation of play over a very wide range.

In an embodiment of the washer according to the invention, the bore of the angular washer is of a conical shape, the washer can be used in combination with screws with the shafts of said screws having a conical connection to the head of the screw.

In another embodiment of the washer according to the invention, the washer is angled perpendicular in reference to a diametric axis by a distance at least equivalent to the thickness of the washer, the washer can be used particularly in cases in which only minor play is to be compensated.

In another embodiment of the washer according to the invention, the angle around which the washer is bent is smaller than 180° and greater or equal to 90° the washer according to the invention provides a potential compensation for play which may vary over a considerably range.

In another embodiment of the washer according to the invention, the washer is of a circular shape the washer can be produced in a simple fashion from a flat washer or the like, while it only must be considered that it comprises a material that can be plastically deformed appropriately.

In another embodiment of the washer according to the invention, the washer has the form of a polygon the washer can be produced in an equivalently simple fashion without requiring to start with a flat circular washer blank.

In another embodiment of the washer according to the invention, the material of the washer comprises carbon steel, i.e. unalloyed steel, the washer comprises a readily available material with its ability for plastic deformation being excellently suited for compensating play.

Based on a threaded assembly of the type mentioned at the outset, the object of the invention is attained such that a washer is arranged between the head of the screw and the work piece, according to claims 1 through 7, and that the length of the unthreaded shaft section is smaller than the sum of the thickness of the work piece and the operational thickness of the washer and essentially is no smaller than the sum of the thickness of the work piece and the original thickness of the washer.

In the threaded assembly according to the invention, in which the screw has an unthreaded shaft section, the thickness of the work piece may be smaller than the length of the unthreaded shaft section in a wider area. In spite thereof, a tight connection is achieved without any play between the head of the screw and the work piece because the selection of the length of the unthreaded shaft section according to the invention provides for sufficient options to compensate play for a wide range of play. The above-mentioned fixed assembly without any play ensures the intended security from any loosening of the screw by inverse rotation. When creating the threaded assembly the screw is simply tightened until the work piece is located in the unthreaded shaft section such that the screw can spin. From that time on, no additional deformation force acts upon the washer. Rather, it maintains its plastic deformation achieved at that time, which precisely compensates the play existing between the work piece and the head of the screw. This option for compensation applies to a range extending to a play equivalent to the original thickness of the washer, i.e. the thickness of the washer in the state prior to it being angled. In this case, the washer is being plastically deformed until the work piece is in the unthreaded shaft section and the washer is once more compressed flat. Of course, in the above-described cases the washer according to the invention must show sufficient tear resistance in the thin plates to be connected, i.e. the force for tearing it out of the work piece must be greater than the force to be applied for plastically deforming the washer. If the thin plates comprise steel sheets or the like, usually sufficient resistance to tearing is provided anyways.

In an embodiment of the threaded assembly according to the invention, the thread of the screw is self-cutting or self-tapping the threaded assembly can be produced in a simple fashion without requiring that a threaded bore is inserted into the work piece in advance.

In another embodiment of the threaded assembly according to the invention, the diameter of the unthreaded shaft section is maximally equivalent to the core diameter of the shaft, and the threaded assembly can be created in a simple fashion without any portion of the force available for the plastic deformation of the washer being wasted to pull the unthreaded shaft section through a bore that is too narrow.

In another embodiment of the threaded assembly according to the invention, the shaft of the screw is provided with a conical connection at the head of the screw, and this connection can be accepted by the bore of the washer, which at least can also be embodied conically by the washer being angular.

In another embodiment of the threaded assembly according to the invention, the bore of the washer is adjusted at least in its unassembled state to the conical connection of the shaft the washer has essentially no axial play with regard to the unthreaded shaft section of the screw even in a completed threaded assembly.

BRIEF DESCRIPTION OF THE DRAWINGS

In the following, exemplary embodiments of the invention are described in greater detail with reference to the drawing. Shown are.

DETAILED DESCRIPTION OF THE PREFERRED EMBODIMENTS

Figure 2:
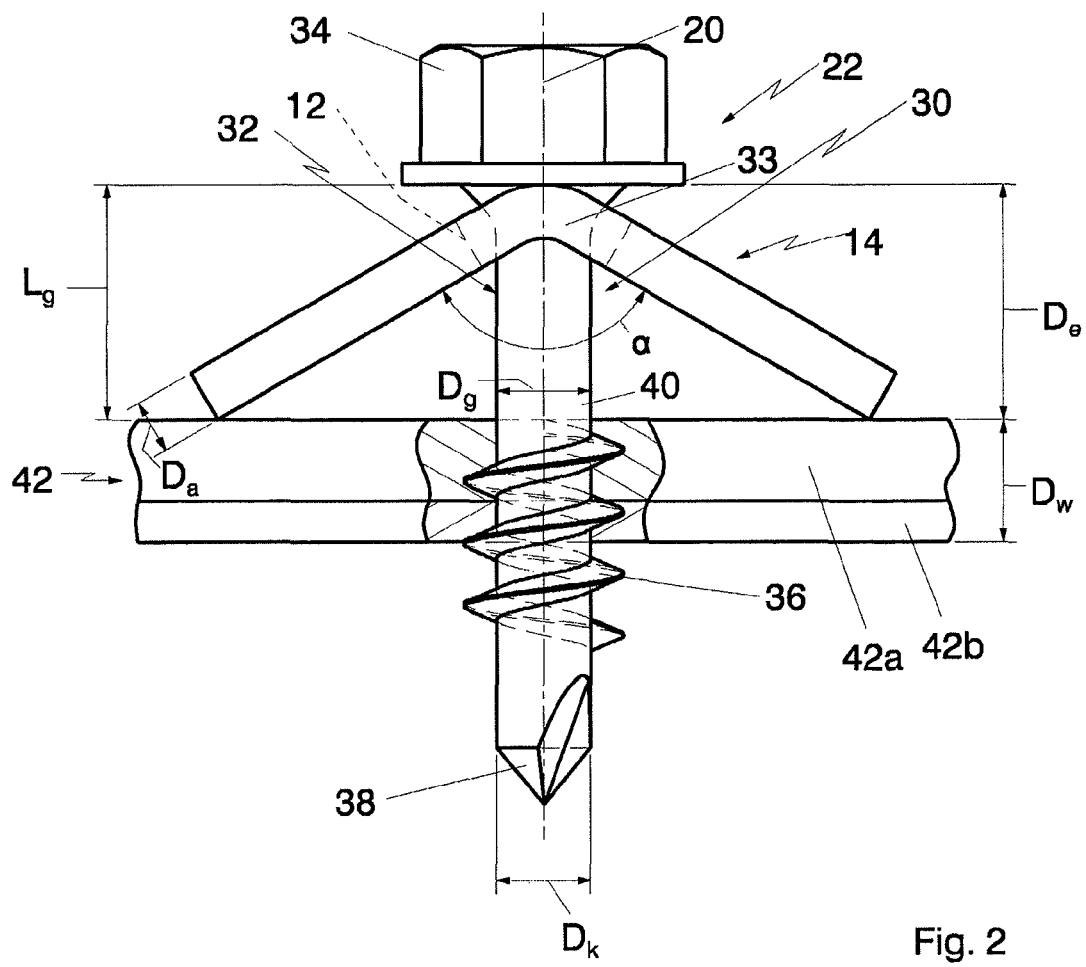
FIG. 2 is a view of a threaded assembly according to the invention at a state in which a washer according to the invention has not yet been deformed by a tightened screw.
Figure 1:
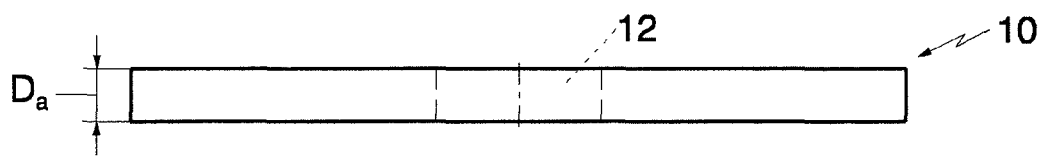
FIG. 1 is a view of a washer blank for a washer according to the invention

FIG. 1 shows an exemplary embodiment of a washer blank marked 10. The washer blank 10 represents a planar, circular washer provided with a conical bore 12. From the washer blank 10, through a process of spatial deformation, an angular washer 14 is produced, as shown in FIG. 2. The bending of the washer blank 10 occurs around at least one axis 16 extending diametrically through the bore 12, as indicated in FIG. 4 by dot-dash lines. The washer blank 10 could additionally be bent (not shown) around e.g., another diametrical axis extending diametrically through the bore 12, perpendicular in reference to the axis 16. In this case, the bending around the diametric axis 16 would occur such that an angular crown line 18, as discernible in FIG. 4, is parallel in reference to the axis 16, and is further perpendicular in reference to the diametric axis 16, namely in both cases each by a distance at least equivalent to the original thickness $D_a$ of the washer 14, i.e. equivalent to the thickness $D_a$ of the washer blank 10. In general, the angle the washer 14 is bent and which for the purpose of the present description is equivalent to angle α, forming the two angular legs of the washer 14, is less than 180° and greater than or equal to 90°. As a washer blank 10 the washer 14 is of a circular shape, but angled by the angle α around the diametric axis 16. The same washer 14 is also of a circular shape, but planar. Instead of a circular shape, the washer may also have the form of a polygon provided with a central bore 12, thus e.g., a square shape. By the bending around the diametric axis 16, the washer is provided with an operational thickness $D_e$ in reference to the initial thickness $D_a$, indicated in FIG. 2, which is considerably larger than the initial thickness $D_a$. The washer 14 comprises a material selected such that the washer can be plastically deformed during the creation of the threaded assembly, described here in greater detail with reference to FIGS. 3 and 4. Beneficially the washer 14 may comprise a soft or unalloyed carbon steel, for example, so that it is not elastically but plastically deformed from the status shown in FIG. 2 under load in the direction of an axis 20. By the bending in reference to the initial status shown in FIG. 1 the washer 14 yields the shape of a gabled roof.

In the following, an exemplary embodiment of the washer 14 with its application is described in FIGS. 2-4 in a threaded assembly marked 22 in its entirety.

A screw 30, with its central axis being the axis 20, is provided with a shaft 32 and a head 34. The shaft 32 is provided with a thread 36. At its free end, facing away from the head 34, the shaft 32 is provided with a hole-boring tip 38, which could also be simply a hole-forming tip. The shaft 32 has an unthreaded shaft section 40 at its end opposite its tip between the head 34 and the thread 36. In the exemplary embodiment shown, a work piece marked 42 in its entirety comprises two thin plates, namely plate 42a and plate 42b, with the latter being thinner than the plate 42a. Preferably, the arrangement of the two thin plates 42a, 42b over top of each other is selected such that the thicker plate 42a is located at the side facing the head 34 of the screw 30, as shown in FIGS. 2 through 4.

The unthreaded shaft section 40 has a length $L_g$ in the axial direction of the screw 30, which in the exemplary embodiment shown has the same operational thickness $D_e$ of the washer 14. According to the invention, the length $L_g$ of the unthreaded shaft section 40 is smaller than the sum of the thickness $D_w$ of the work piece 42 and the operational thickness $D_e$ of the washer 14. In any case, the length $L_g$ of the unthreaded shaft section 40 should not be shorter than the sum of the thickness $D_w$ of the work piece 42 and the initial thickness $D_a$ of the washer 14 and/or the washer blank 10. At appropriately thin plates 42a, 42b to be connected to each other, this embodiment allows an overwinding of the screw 30 without the torque rising excessively. As soon as the screw 30 is overwound, the thin plates 42a, 42b are held tightly together, and it is practically impossible for the threaded assembly to be released by an inverse rotation of the screw 30. This status is shown in FIGS. 3 and 4, which will be discussed in greater detail in the following. When the length $L_g$ of the unthreaded shaft section 40 is slightly shorter than the sum of the thickness $D_w$ of the two thin plates 42a, 42b, and the initial thickness $D_a$ of the washer 14, the possibility also exists that the screw 30 can overwind after the final placement. Here, it engages the bottom of the thin plate 42b to a slight extent only.

The thread 36 of the screw 30 is self-cutting or self-tapping. In the exemplary embodiment described here the diameter $D_a$ (FIG. 2) of the unthreaded shaft section 40 is equivalent to the core diameter $D_k$ of the thread 36. The shaft 32 of the screw 30 is provided with a conical connection 33 at the head 34 of the screw 30. At least in its unassembled state, the bore 12 of the washer 14 is adjusted to the conical connection 33 of the shaft 32, as indicated in FIGS. 2-4, in which the conical connection 33 is accepted in the conical bore 12 with play.

In the following, the placement of the screw is described in greater detail with reference to FIGS. 2-4. In the status of the threaded assembly 22, shown in FIG. 2, the angled washer 14 bridges the distance between the top of the work piece 42 and the bottom of the head 34 of the screw, but is not yet deformed. The operational thickness $D_e$ of the angled washer 14 is therefore identical to the length $L_g$ of the unthreaded shaft section 40. The screw 30 has previously bored a hole with the core diameter $D_k$ into the work piece 42, using its tip 38, and subsequently tapped a thread 43 into the work piece 42, using its thread 36, with the screw 30 having been screwed in to such an extent that its uppermost winding comes to rests at the level of the top of the thin plate 42a and thus is flush in reference thereto, as shown in FIG. 2.

Figure 3:
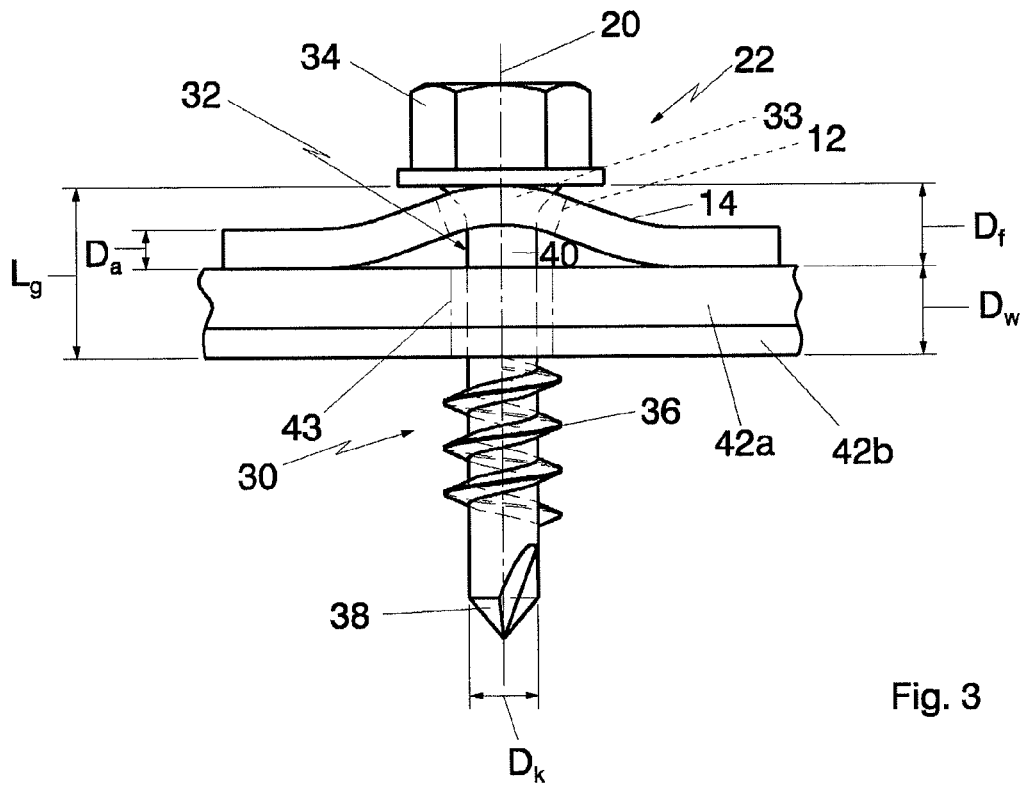
FIG. 3 is a view of the threaded assembly according to the invention at a state in which the washer according to the invention has been plastically deformed.
Figure 4:
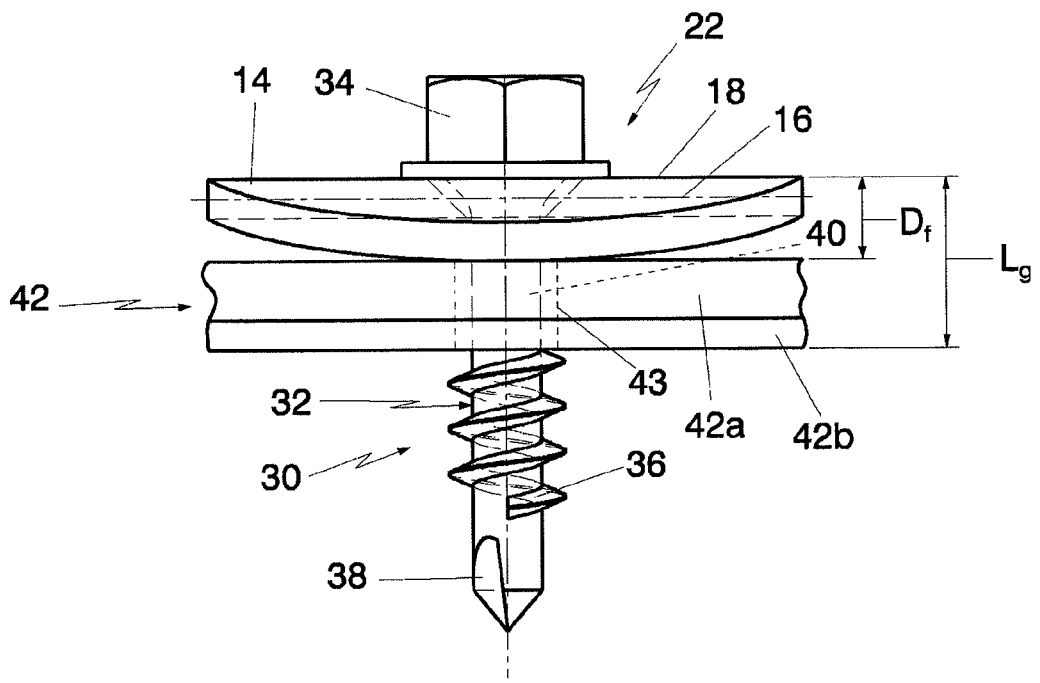
FIG. 4 is a side view of the threaded assembly according to FIG. 3.

When the screw 30 is screwed in further, the washer 14 is plastically deformed into an increasingly flatter status by the increasing feed of the screw 30 and finally reaches the status shown in FIG. 3, in which the uppermost winding of the thread 36 exits from the bottom of the threaded bore in the work piece 42 and is located at the level of the bottom of the thin plate 42b. From this moment on, the screw 30 can overwind without this resulting in any further feed in the direction of the axis 20. Simultaneously the plastic deformation of the washer 14 stops, with the washer now remaining in the status shown in FIGS. 3 and 4. FIG. 3 shows the washer 14 in a front view, and FIG. 4 shows the washer 14 in a side view. The washer 14, which had the operational thickness $D_e$ in FIG. 2, has now a considerably smaller thickness $D_f$, which compensates a play of equivalent size. The bending of the washer in the initial status according to FIG. 2 and the material of the washer 14 are selected, at a given initial thickness $D_a$ of the washer 14, in reference to the tearing or pull-out force of the washer 30 from the work piece 42 such that the forces applied by the feed of the screw 30 on the washer 14 for plastically deforming it is always smaller than the pull-out force. The pre-stressing force applied on the washer 14 in the status according to FIGS. 3 and 4 is zero as soon as the thread 36 has left the engagement of the thread with the work piece 42.

According to prior art, as described at the outset using the examples of DE 197 18 712 C1 and U.S. Pat. No. 2,321,379, an attempt to select the overall thickness of the thin plates such that they are as equivalent as possible or at best only slightly larger than the length of the unthreaded shaft section in order to hold the plates tightly pressed against the bottom of the head of the screw as soon as the screw overwinds in the plates. However, if the thickness of the thin plates varies and thus an axial play develops between the bottom of the head of the screw and the adjacent thin plate there is no possibility in prior art to compensate for said play. In the threaded assembly 22 described here the length $L_g$ of the unthreaded shaft section 40 is from the start designed equivalent to the operational thickness $D_e$ of the angular washer 14, with the operational thickness $D_e$, by necessity being larger than the initial thickness $D_a$ of the washer 14. Comparing FIG. 2 to FIG. 3 it is discernible that the washer 14 can be compressed at a corresponding thickness $D_w$ of the work piece 42 to the thickness $D_a$ of the washer 14, with then $D_a$ becoming equivalent to $D_f$. Preferably, $D_f$ should be greater than $D_a$, to provide greater security for compensating the distance remaining from the bottom of the head 34 of the screw to the top of the work piece 42 in the status in FIG. 3 in case of varying play. In the placed status shown in FIGS. 3 and 4 of the screw 30 the angled washer 14 has been compressed flat in reference to the status in FIG. 2 by the thickness $D_w$ of the work piece 42. The thickness of the work piece 42 therefore determines the maximum possible deformation of the washer 14. The deformation can reach such an extent that finally the washer 14 is of a thickness $D_f$, which is equivalent to the initial thickness $D_a$, as above-explained. However, an embodiment in which $D_f$ is greater than $D_a$ offers more tolerance.

In the exemplary embodiment shown, the washer 14 represents a circular washer angled around an axis 16. In the status shown in FIG. 2 it practically contacts the top of the work piece 42 only locally at two diametrically opposite places. When the washer 14 is further compressed by way of plastic deformation into the flat status shown in FIGS. 3 and 4, the initial localized contacts at both legs of the washer 14 transfer into increasingly planar contacts, as discernible in FIGS. 3 and 4. In this status the washer 14 thoroughly contacts the surface of the work piece 42 at both sides of the screw 30.

The invention claimed is:

1. A threaded assembly comprising a screw (30) and a work piece (42), with the screw (30) having a shaft (30) provided with a thread (36) and at a free end, facing away from the head (34) having a hole-forming or hole boring tip (38) and an unthreaded shaft section (40) at its end adjacent to the head (34) and with the work piece (42) comprising at least one thin plate (42a, 42b), a washer (14) is arranged between the head (34) of the screw (30) and the work piece (42), with the washer (14) being provided with a bore (12) for accepting the screw (30) and which is spatially deformed around an axis (16) extending diametrically through the bore (12), the washer (14) is bent around the diametric axis (16) such that an angular crown line (18) is parallel in reference to the axis (16) and the washer (14) is angled and has an operational thickness ($D_e$) greater than an initial thickness ($D_a$) of the washer (14), and the washer (14) comprises a material selected such that the washer (14) is plastically deformed during installation, and a length ($L_g$) of the unthreaded shaft section (40) is smaller than a sum of a thickness ($D_w$) of the work piece (42) and the operational thickness ($D_e$) of the washer (14) and is essentially not smaller than the sum of the thickness ($D_w$) of the work piece (42) and the initial thickness ($D_a$) of the washer (14) so that play is compensated as an uppermost winding of the thread exits a bottom of a threaded bore formed by the screw in a bottom-most one of the at least one thin plate.

2. The threaded assembly according to claim 1, wherein the thread (36) of the screw (30) is self-cutting or tapping.

3. The threaded assembly according to claim 1, wherein a diameter ($D_g$) of the unthreaded shaft section (40) is no greater than a core diameter ($D_k$) of the thread (36).

4. The threaded assembly according to claim 1, wherein the shaft (32) of the screw (30) is provided with a conical connection (33) at the head (34) of the screw (30).

5. The threaded assembly according to claim 4, wherein the bore (12) of the washer (14) is at least adjusted in an unassembled state of the washer (14) to a conical connection (33) of the shaft (32).

* * * * *